United States Patent
LeCompte et al.

(10) Patent No.: US 8,024,122 B2
(45) Date of Patent: Sep. 20, 2011

(54) METHOD FOR DETERMINING FORMATION WATER RESISTIVITY FROM A WIRELINE PULSED NEUTRON DEVICE

(75) Inventors: Brian J. LeCompte, Tomball, TX (US); Richard R. Pemper, Sugar Land, TX (US); Xiaogang Han, Tomball, TX (US)

(73) Assignee: Baker Hughes Incorporated, Houston, TX (US)

( * ) Notice: Subject to any disclaimer, the term of this patent is extended or adjusted under 35 U.S.C. 154(b) by 537 days.

(21) Appl. No.: 12/146,071

(22) Filed: Jun. 25, 2008

(65) Prior Publication Data

US 2009/0326825 A1   Dec. 31, 2009

(51) Int. Cl.
*G01V 3/38* (2006.01)
(52) U.S. Cl. .......................................... 702/8
(58) Field of Classification Search .................. 702/8
See application file for complete search history.

(56) References Cited

OTHER PUBLICATIONS

Archie, G.E., "The Electrical Resistivity Log as an Aid in Determining Some Reservoir Characteristics". Manuscript at the office of the Institute Sep. 27 Revised Dec. 8, 1941. Issued as T.P. 1422 in Petroleum Technology, Jan. 1942. pp. 54-62.
Baker Atlas Log Interpretation Charts. Western Atlas, Atlas Wireline Service. 1985. Section 2.
Jacobi, D., "A Chemistry-Based Expert System for Mineral Quantification of Sandstones", Paper (1.3.45) in Petrotech 7th International Oil and Gas Conference and Exhibition, Jan. 15-19, 2007 New Delhi, India.
Pemper, R., "A New Pulsed Neutron Sonde for Derivation of Formation Lithology and Mineralogy", SPE Paper 102770, Sep. 24-27, 2006.

*Primary Examiner* — Tung S Lau
(74) *Attorney, Agent, or Firm* — Cantor Colburn LLP

(57) ABSTRACT

A method for estimating resistivity of a formation includes: selecting spectra collected by pulsed neutron instrument disposed down a wellbore traversing the formation, the spectra including capture interactions and inelastic interactions; deconvolving the spectra to estimate an elemental yield; converting the elemental yield to a total concentration value; subtracting a concentration value for drilling mud and a concentration value for the formation from the total concentration value to estimate a concentration in fluid within the formation; and converting the fluid concentration value to a resistivity value. A computer program product and an instrument are provided.

20 Claims, 4 Drawing Sheets

METHOD FOR DETERMINING FORMATION WATER RESISTIVITY FROM A WIRELINE PULSED NEUTRON DEVICE

BACKGROUND OF THE INVENTION

1. Field of the Invention

The invention disclosed herein relates to oil exploration and, in particular, to a method for using nuclear data to provide related indications of resistivity values.

2. Description of the Related Art

Water saturation and hydrocarbon saturation, its complement, are two of the most important petrophysical parameters. Connate water resistivity, has been one of the main inputs to all water saturation equations. Until now, water saturation has been measured almost exclusively from electric logs sensitive to bulk resistivity using one of a multitude of empirical functions. None of these functions has satisfactorily accounted for the many variables in downhole resistivity, resulting in great disarray in the industry and uncertainty in the final result.

Chlorine is an important part of the formations measured by wireline logging. It is present in at least three forms: as a solid part of a surrounding rock matrix, as an ion in the pore fluid, and as an ion in the formation fluid.

Salt content in the rock matrix is often known from other information such as core descriptions, mud logs, X-Ray fluorescence, X-Ray diffraction, and other wireline devices. The salt content is converted to a concentration of chlorine in kppm. In many wells, the salt content is effectively 0 kppm.

The chlorine concentration of the borehole fluid is often known directly from the mud report given by the drilling fluid operator. However, chlorine content is not always uniform in a wellbore due to salinity gradients and other driving forces. One method of knowing the chlorine content in a wellbore is the use of a wireline temperature and mud resistivity log.

Temperature and pressure have an effect on resistivity, temperature more so than pressure. In the preferred embodiment of this invention, the effects of pressure are considered negligible. The mud resistivity measurements can be converted to yield a constant temperature.

Some instruments that may be used downhole do not operate principally as a resistivity instrument. For example, a pulsed neutron instrument may be used to collect valuable data. Unfortunately, when the pulsed neutron instrument is in use, this may preempt resistivity measurements with a resistivity instrument.

Therefore, what are needed are techniques for generating forms of resistivity data from a pulsed neutron instrument. Preferably, the techniques are useful for identifying elemental constituents, such as chlorine.

BRIEF SUMMARY OF THE INVENTION

In one embodiment, the invention includes a method for estimating resistivity of a formation, the method including: selecting spectra collected by pulsed neutron instrument disposed down a wellbore traversing the formation, the spectra including capture interactions and inelastic interactions; deconvolving the spectra to estimate an elemental yield; converting the elemental yield to a total concentration value; subtracting a concentration value for drilling mud and a concentration value for the formation from the total concentration value to estimate a concentration in fluid within the formation; and converting the fluid concentration value to a resistivity value.

In another embodiment, the invention includes a computer program product including machine readable and executable instructions stored on machine readable media, the instructions for estimating resistivity of a formation, by implementing a method including: selecting spectra collected by pulsed neutron instrument disposed down a wellbore traversing the formation, the spectra including capture interactions and inelastic interactions; deconvolving the spectra to estimate an elemental yield; converting the elemental yield to a total concentration value; subtracting a concentration value for drilling mud and a concentration value for the formation from the total concentration value to estimate a concentration in fluid within the formation; and converting the fluid concentration value to a resistivity value.

In another embodiment, the invention includes a instrument for imaging an earth formation, the instrument including: a pulsed neutron source and at least one gamma ray detector, the source and the detector coupled to a processor; the processor equipped with a computer program product including machine readable and executable instructions stored on machine readable media, the instructions for estimating resistivity of a formation, by implementing a method including: selecting spectra collected by pulsed neutron instrument disposed down a wellbore traversing the formation, the spectra including capture interactions and inelastic interactions; deconvolving the spectra to estimate an elemental yield; converting the elemental yield to a total concentration value; subtracting a concentration value for drilling mud and a concentration value for the formation from the total concentration value to estimate a concentration in fluid within the formation; and converting the fluid concentration value to a resistivity value.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION OF THE INVENTION

Disclosed are techniques for generating forms of resistivity data from a pulsed neutron instrument. The techniques are useful for identifying elemental constituents, such as chlorine. One skilled in the art will recognize that this is illustrative and not limiting of the teachings herein.

In general, methods provide for determining resistivity of water in surrounding formations using a wireline pulsed neutron instrument. The logging instrument includes a tool that traverses a wellbore with a pulsed neutron source and gamma ray detector. Gamma ray spectra are acquired in different time gates to distinguish the inelastic, capture, and background spectra. The spectra are deconvolved based on a finite number of elemental standards, one of which is chlorine. The chlorine spectral yield is converted to a concentration value based on an empirical function. This function may include parameters such as the fraction of fluid in the formation (porosity) and the borehole size. The total chlorine signal analyzed by the tool includes chlorine in the borehole fluid, chlorine in the rock matrix, and chlorine in the pore fluid. The chlorine in the rock matrix and borehole fluid may be calculated or assumed and then subtracted from the total chlorine signal. The resultant chlorine concentration is then converted to an equivalent resistivity value.

Figure 1:
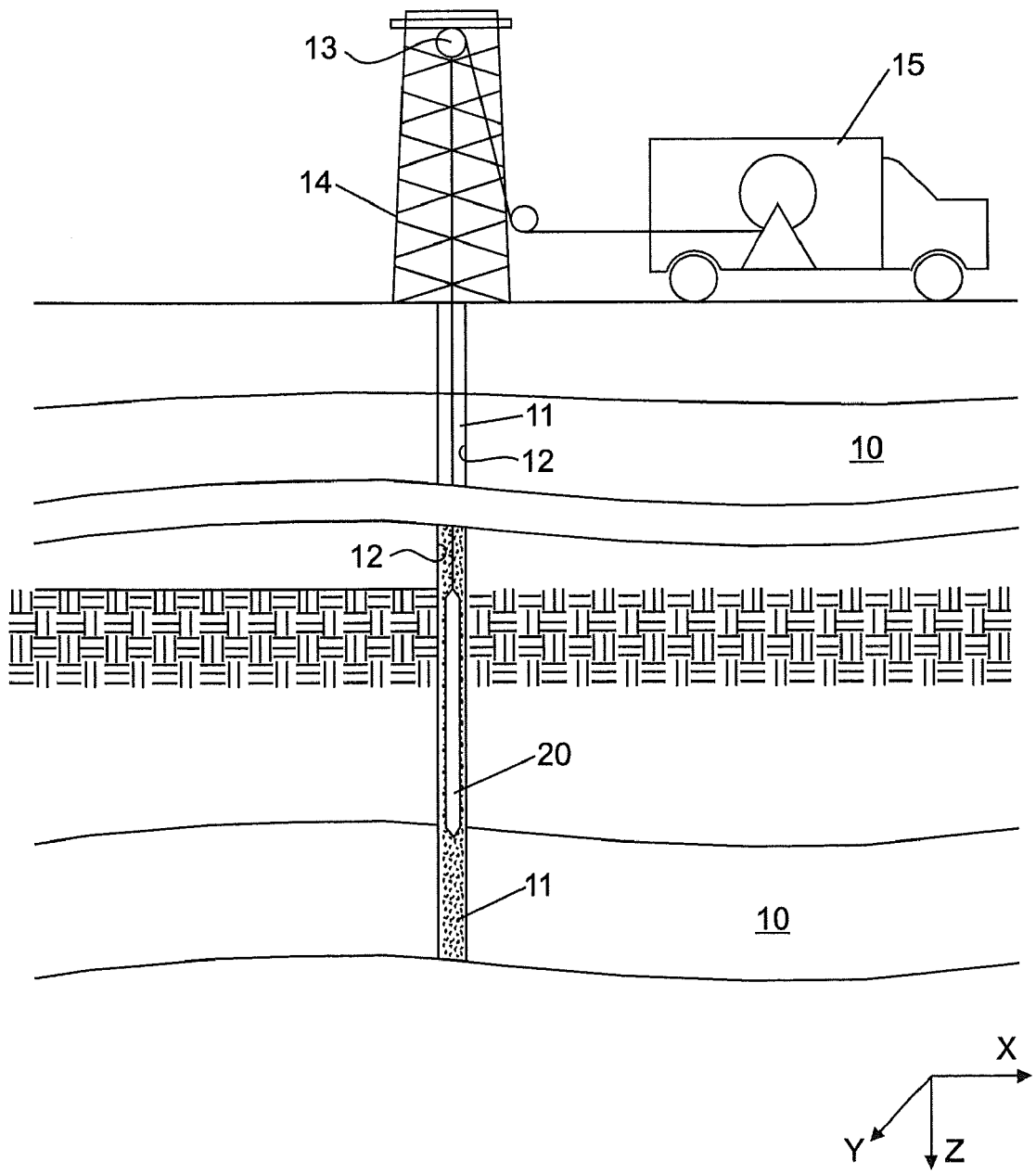
FIG. 1 depicts aspects of an apparatus for wireline logging.

Referring to FIG. 1, a cross-section of earth 10 along the length of a penetration referred to as a "borehole" 11 is depicted. Usually, the borehole 11 (also referred to as a "wellbore") is at least partially filled with a mixture of liquids including water, drilling fluid, and formation fluids that are indigenous to the earth formations penetrated by the borehole 11. For convenience of description herein, it is considered that the borehole 11 is surrounded by "formations." The formations may include geologic formations, but, in general, the term "formations" makes reference to sub-surface materials as may be surveyed according to the teachings herein.

Suspended within the borehole 11 at the bottom end of a wireline 12 is an instrument 20. The wireline 12 is often carried over a pulley 13 supported by a derrick 14. Wireline 12 deployment and retrieval is typically performed by a powered winch carried by a service truck 15. Of course, the techniques disclosed herein are useful in other embodiments (i.e., other than wireline logging), wherever the pulsed neutron instrument (or another type of nuclear instrument providing similar data) may be used.

In general, a coordinate system for describing a location of the sampling instrument 20 includes a Z-axis, a Y-axis and a X-axis. In the embodiments depicted, the Z-axis describes a vertical component of the coordinate system.

One non-limiting example of the instrument 20, or associated services provided by the instrument 20, are referred to as FLEXTOOL™, provided by Baker Hughes, Incorporated of Houston, Tex.

In this example, the instrument generally provides lithological and quantitative mineralogical information for accurate formation evaluation. The assessment begins with elemental formation weights and follows with an interpretation of lithology and mineralogy. Lithologies are divided into general categories including sand, shale, coal, carbonates, and evaporites. Potentially identifiable minerals are quartz, potassium-feldspar, albite, calcite, dolomite, siderite, anhydrite, illite/smectite, kaolinite, glauconite, chlorite, pyrite, and others. The logging system utilizes an electronic pulsed source to send high energy neutrons into the surrounding formation. These neutrons quickly lose energy as a result of scattering, after which they are absorbed by the various atoms within the ambient environment. The scattered as well as the absorbed neutrons cause the atoms of the various elements to emit gamma rays with characteristic energies. These are measured with a scintillation detector, resulting in both inelastic and capture gamma ray energy spectra. A matrix inversion spectral fit algorithm may be used to analyze these spectra in order to separate the total response into its individual elemental components. The prominent measured elements associated with subsurface rock formations include chlorine, calcium, silicon, magnesium, carbon, sulfur, aluminum, and iron. Potassium, thorium, and uranium may be measured separately, such as with a natural gamma ray spectroscopy instrument. As discussed herein, data collected with this instrument 20, or an equivalent thereof, is generally considered "activation data," and by other similar terms known in the art.

The teachings presented herein do not use actual resistivity measurements to obtain a water resistivity. Instead, resistivity, such as that of the chlorine, is measured directly by means of the pulsed neutron logging instrument. Advantageously, the techniques provide users with an open-hole device that permits conversion of nuclear data to an equivalent resistivity value.

Embodiments of the instrument 20 used with this invention include a pulsed neutron source and gamma ray detector. The source operates in certain time gates. In a first gate, both capture and inelastic interactions occur between the emitted neutrons and the incident nuclei (in surrounding formations). This spectrum is referred to as a "total spectrum." When the source is turned off during the second gate, only capture interactions occur. This capture signal is then extrapolated back to the time during the first gate using a function.

The capture and inelastic spectra are aligned using gamma ray energy peaks and a linear transformation. Once aligned, the capture spectrum is subtracted from the total spectrum, leaving only the spectrum generated from inelastic interactions.

Once the capture spectrum is separated from the inelastic spectrum, it is deconvolved into a finite number of elemental yields. These yields may be established from empirically derived standards. For example, the yields may be obtained by operating the instrument 20 in a block or tank that generally contains only the pure element in question. If the pure element cannot be isolated, then other elements can be measured first and then subtracted from the total spectrum in question until only the pure element remains. One way of obtaining a pure chlorine spectrum is to measure the total spectrum of a salt saturated water tank and subtract the other capture elements present.

One embodiment of this invention uses the following weighted least-squares algorithm to deconvolve the spectrum:

$$d=(y_1 s_1 + y_2 s_2 + \ldots y_n s_n) + \hat{I} \quad (1);$$

which may be restated as:

$$d = Sy + \hat{I} \quad (2);$$

$$\hat{I}^T W \hat{I} = (d - Sy)^T W (d - Sy) \quad (3);$$

$$y = [(S^T W S)^{-1} S^T W] d \quad (4);$$

$$y = Ed$$

where:
d=data spectrum column vector;
s=elemental standard column vector;
S=elemental standards matrix;
E=estimator matrix;
y=elemental yields column vector; and
$\hat{I}$=error to be minimized.

Thus, chlorine yield may be separated from the total capture spectrum using this measurement. Accordingly a method to convert chlorine yield to a Cl concentration value is now provided.

Once the chlorine yield is obtained, it must be converted to a meaningful value, such as concentration (e.g., in kppm). One method for doing this involves measuring the chlorine content in blocks with known elemental content and different borehole sizes and porosities. The measured chlorine content can then be correlated to the measured chlorine yield using several functions that take borehole size and porosity into account as well as other factors.

The chlorine concentration value obtained from the pulsed neutron device represents chlorine signals coming from the borehole fluid, rock matrix, and formation fluid. It is represented by the variable $Cl_{tot}$, for total chlorine.

To subtract the mud resistivity, the mud resistivity must first be estimated. One way of estimating the mud resistivity is by a calculation using data from a mud resistivity and temperature log. An example is provided in Eq. (5):

$$R_{w2} = R_{w1}\left(\frac{T_1 + 6.77}{T_2 + 6.77}\right). \quad (5)$$

In Eq. (5), $R_{w2}$ represents the desired mud resistivity corrected for a constant temperature. $R_{w1}$ represents the measured mud resistivity at each depth. $T_1$ represents a measured temperature, and, in this example, $T_2$ is given at 75 degrees Farenheit.

Figure 2:
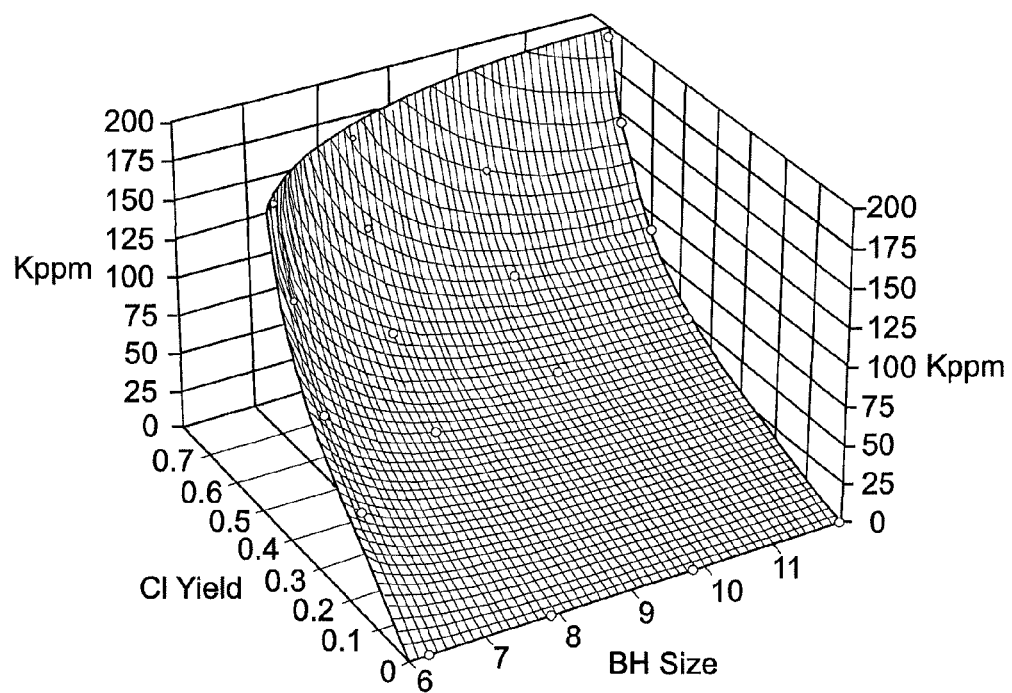
FIG. 2 is a graph providing a conversion function.

Once the mud resistivity is converted to a constant temperature, it needs to be converted to an effective chlorine value. Use of external references, such as a chart book, may be used to obtain an approximate equation for transforming resistivity to salinity. One example of another external reference is provided in FIG. 2, which is a graphical depiction of a function for converting chlorine yield to concentration.

Mud resistivity, $R_w$, may now be converted to salinity. As an example, consider $R_w$ to NaCl salinity conversion, where salinity=$10^x$ ppm at 75 degrees Farenheit, as provided in Eq. (6):

$$x \approx \frac{3.562 - \log(R_{w75} - 0.0123)}{0.955}. \quad (6)$$

In Eq. (6), the calculation provides for NaCl concentration, but the preferred embodiment of this invention gives a chloride (Cl—) measurement. A concentration of NaCl versus other salts in the formation fluid is assumed, and generally considered to be about 100% NaCl. The NaCl salinity converted from the mud resistivity is then adjusted to an equivalent chloride concentration using the following relation provided as Eq. (7):

$$Cl_{mud} = 1.645 * X_{Cl-} \quad (7);$$

where units are in ppm.

Formation fluid chloride ($Cl_{por}$) may then be determined by subtraction, as provided in Eq. (8):

$$Cl_{por} = Cl_{tot} - (Cl_{mud} + Cl_{mat}) \quad (8);$$

where $Cl_{mat}$ is usually assumed to be about zero (0), $Cl_{mud}$ is calculated from mud resistivity or some other method, and $Cl_{tot}$ is measured by the aforementioned pulsed neutron logging device.

According, a concentration of formation fluid chloride ($Cl_{por}$) to resistivity conversion may be performed. That is, most saturation equations and other petrophysical equations require the salinity of the formation water in resistivity units rather than salt concentration. Once the chloride content of the formation water is known, it can be converted to a resistivity using Eq.(7) and rearranging Eq. (6):

$$NaCl_{por} = Cl_{por} * 1.645$$

$$R_{w75} = 0.0123 + \frac{3647.5}{[NaCl_{por}]^{0.955}}$$

If desired, the $R_w$ can also be converted back to in situ temperatures using Eq.(5) and a downhole temperature measurement.

Figure 3:
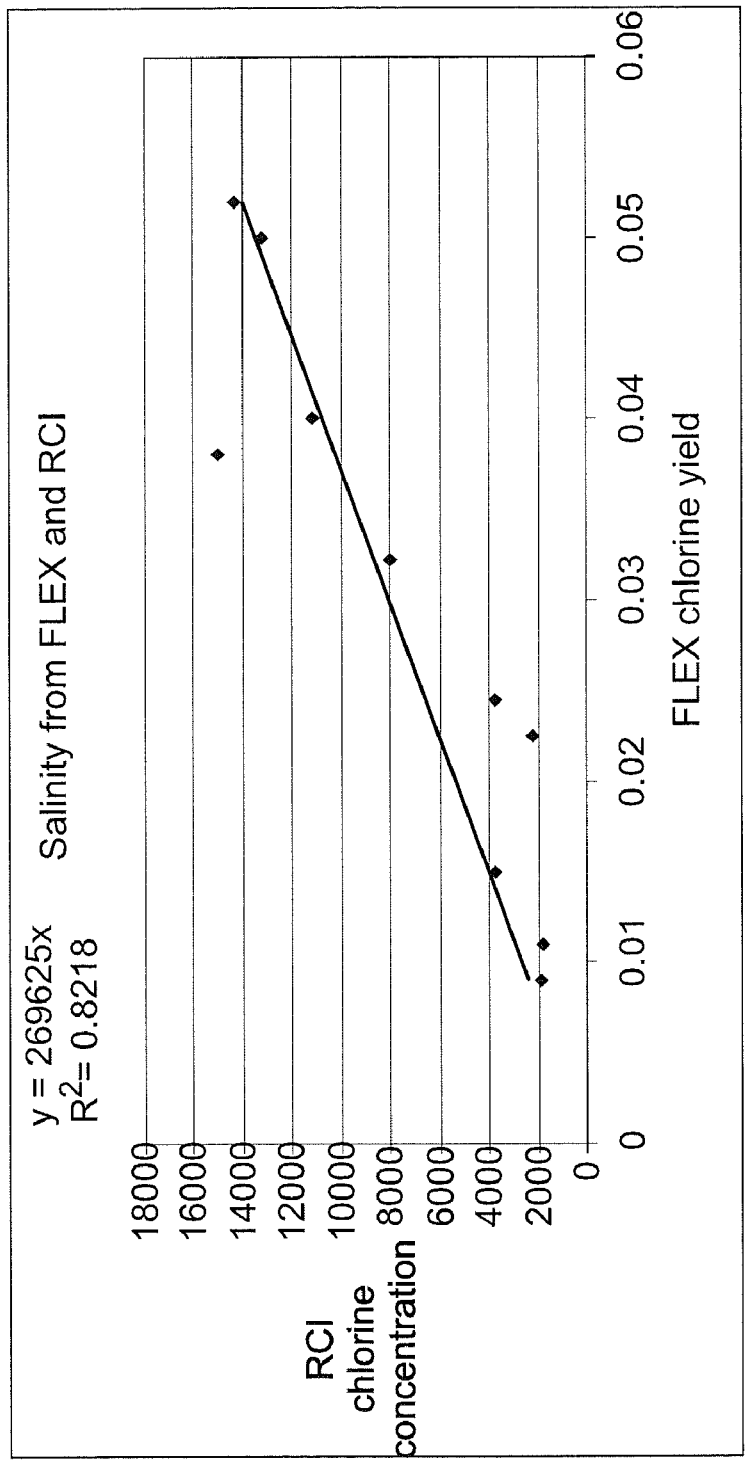
FIG. 3 depicts test results.

Now with further reference to the diagrams, FIG. 3 is a graph depicting correlation of measurements to calculations.

In FIG. 3, initial results show a total chlorine yield correlated to measured chlorine concentration. The concentration points were obtained from fluids from a downhole formation tester. The chlorine yield was averaged over four feet. Each point represents a different well. The uppermost right point and the point at (0.038,15000) are from the same well. All the wells were drilled with fresh mud in a sand/shale environment, so the $Cl_{mud}$ and $Cl_{mat}$ are assumed to be 0.

Figure 4:
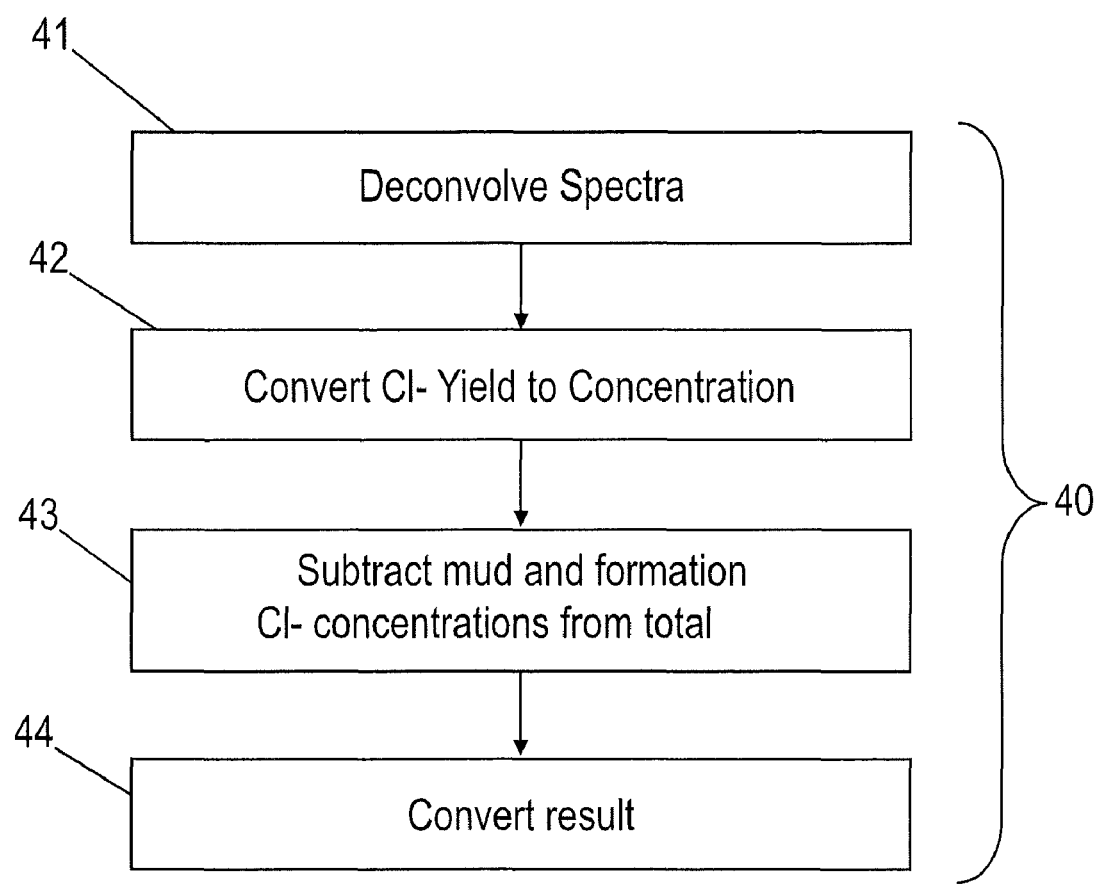
FIG. 4 depicts an exemplary method according to the teachings herein.

In FIG. 4, an exemplary method 40 for determining resistivity is provided. In the method 40, in a first stage 41, spectra are deconvolved to provide a chlorine yield. In a second stage 42, the chlorine spectral yield is converted to a concentration value based on an empirical function. In a third stage 43, chlorine in the rock matrix and borehole fluid may be calculated or assumed and then subtracted from the total chlorine signal. In a fourth stage 44, the resultant chlorine concentration is then converted to an equivalent resistivity value.

One skilled in the art will recognize that resistivity properties of other components (e.g., elements) influencing resistivity may be ascertained in this manner. Accordingly, while the disclosure provided herein is presented in terms of chlorine, this is not limiting of the invention.

Accordingly, a method for determining the formation water resistivity using a wireline pulsed neutron instrument is presented. The logging device includes a tool that traverses a wellbore with a pulsed neutron source and gamma ray detector. Gamma ray spectra are acquired in different time gates to distinguish the inelastic, capture, and background spectra. The spectra are deconvolved based on a finite number of elemental standards, one of which is chlorine. The chlorine spectral yield is converted to a concentration value based on an empirical function. The total chlorine signal analyzed by the tool consists of chlorine in the borehole fluid, chlorine in the rock matrix, and chlorine in the pore fluid. The chlorine in the rock matrix and borehole fluid are calculated or assumed and then subtracted from the total chlorine signal. The resultant chlorine concentration may then be converted to an equivalent resistivity value.

In support of the teachings herein, various analysis components may be used, including digital and/or an analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

One skilled in the art will recognize that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof Therefore, it is intended that the invention not be limited to the particular embodiment disclosed as the best mode contemplated for carrying out this invention, but that the invention will include all embodiments falling within the scope of the appended claims.

What is claimed is:

1. A method for estimating resistivity of a formation, the method comprising:
    collecting spectra using a pulsed neutron instrument disposed down a wellbore traversing the formation, the spectra comprising capture interactions and inelastic interactions;
    deconvolving the spectra to estimate an elemental yield;
    converting the elemental yield to a total concentration value;
    subtracting a concentration value for drilling mud and a concentration value for the formation from the total concentration value to estimate a concentration in fluid within the formation; and
    converting the fluid concentration value to a resistivity value.

2. The method as in claim 1, wherein the elemental yield comprises a yield of chlorine, $Cl_{tot}$.

3. The method as in claim 1, wherein the concentration value for the formation is one of estimated, calculated and measured.

4. The method as in claim 1, wherein the concentration value for drilling mud is determined by one of estimating, calculating and measuring.

5. The method as in claim 4, wherein the calculating comprises solving a relationship comprising:

$$R_{w2} = R_{w1}\left(\frac{T_1 + 6.77}{T_2 + 6.77}\right);$$

where
    $R_{w2}$ represents a desired mud resistivity corrected for a constant temperature, $R_{w1}$ represents a measured mud resistivity at a given depth, $T_1$ represents a measured temperature, and, $T_2$ represents a preselected temperature.

6. The method as in claim 5, further comprising estimating a salinity, x, of the drilling mud by solving a relationship comprising:

$$x \approx \frac{3.562 - \log(R_{w2} - 0.0123)}{0.955}.$$

7. The method as in claim 6, further comprising converting the salinity, x, into an equivalent chlorine concentration, $Cl_{mud}$, by solving the relationship:

$Cl_{mud} = 1.645 * X_{Cl^-}$.

8. The method as in claim 7, further comprising estimating chlorine content of fluid within the formation $Cl_{por}$, by solving the relationship comprising:

$Cl_{por} = Cl_{tot} - (Cl_{mud} + Cl_{mat})$;

where $Cl_{mat}$ is one of estimated and measured.

9. The method as in claim 8, further comprising estimating a resistivity of the fluid within the formation, $R_{w75}$, according to the relationships:

$$NaCl_{por} = 1.645 * Cl_{por}; \text{ and}$$

$$R_{w75} = 0.0123 + \frac{3647.5}{[NaCl_{por}]^{0.955}}.$$

10. The method as in claim 9, further comprising converting the resistivity of the fluid within the formation, $R_{w75}$, to a temperature downhole.

11. A non-transitory computer readable medium comprising computer executable instructions for estimating resistivity of a formation, by implementing a method comprising:
    collecting spectra using a pulsed neutron instrument disposed down a wellbore traversing the formation, the spectra comprising capture interactions and inelastic interactions;
    deconvolving the spectra to estimate an elemental yield;
    converting the elemental yield to a total concentration value;
    subtracting a concentration value for drilling mud and a concentration value for the formation from the total concentration value to estimate a concentration in fluid within the formation; and
    converting the fluid concentration value to a resistivity value.

12. The computer program product as in claim 11, wherein the elemental yield comprises a yield of chlorine, $Cl_{tot}$.

13. The computer program product as in claim 11, wherein the concentration value for the formation is one of estimated, calculated and measured.

14. The computer program product as in claim 11, wherein the concentration value for drilling mud is determined by one of estimating, calculating and measuring.

15. The computer program product as in claim 14, wherein the calculating comprises solving a relationship comprising:

$$R_{w2} = R_{w1}\left(\frac{T_1 + 6.77}{T_2 + 6.77}\right);$$

where
    $R_{w2}$ represents a desired mud resistivity corrected for a constant temperature, $R_{w1}$ represents a measured mud resistivity at a given depth, $T_1$ represents a measured temperature, and, $T_2$ represents a preselected temperature.

16. The computer program product as in claim 15, further comprising estimating a salinity, x, of the drilling mud by solving a relationship comprising:

$$x \approx \frac{3.562 - \log(R_{w2} - 0.0123)}{0.955}.$$

17. The computer program product as in claim 16, further comprising converting the salinity, x, into an equivalent chlorine concentration, $Cl_{mud}$, by solving the relationship:

$Cl_{mud} = 1.645 * X_{Cl^-}$.

18. The computer program product as in claim 17, further comprising estimating chlorine content of fluid within the formation $Cl_{por}$, by solving the relationship comprising:

$Cl_{por}=Cl_{tot}-(Cl_{mud}+Cl_{mat})$;

where $Cl_{mat}$ is one of estimated and measured.

19. The computer program product as in claim 18, further comprising estimating a resistivity of the fluid within the formation, $R_{w75}$, according to the relationships:

$$NaCl_{por} = 1.645 * Cl_{por}; \text{ and}$$

$$R_{w75} = 0.0123 + \frac{3647.5}{[NaCl_{por}]^{0.955}}.$$

20. A instrument for imaging an earth formation, the instrument comprising:
a pulsed neutron source and at least one gamma ray detector, the source and the detector coupled to a processor; the processor equipped with a non-transitory computer readable medium comprising computer executable instructions for estimating resistivity of a formation, by implementing a method comprising:
collecting spectra using the pulsed neutron instrument disposed down a wellbore traversing the formation, the spectra comprising capture interactions and inelastic interactions;
deconvolving the spectra to estimate an elemental yield;
converting the elemental yield to a total concentration value;
subtracting a concentration value for drilling mud and a concentration value for the formation from the total concentration value to estimate a concentration in fluid within the formation; and
converting the fluid concentration value to a resistivity value.

* * * * *